(12) United States Patent
Wagner et al.

(10) Patent No.: US 6,855,655 B2
(45) Date of Patent: Feb. 15, 2005

(54) SUPPORTED POLYMERIZATION CATALYST

(75) Inventors: Burkhard Eric Wagner, Highland Park, NJ (US); Michael D. Awe, Langhorne, PA (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/196,682

(22) Filed: Jul. 15, 2002

(65) Prior Publication Data

US 2004/0138054 A1 Jul. 15, 2004

(51) Int. Cl.[7] .................. B01J 31/00; B01J 37/00; C08F 4/02; C08F 4/60
(52) U.S. Cl. .............. 502/118; 526/124.2; 526/116; 252/183.13
(58) Field of Search ............... 502/118; 526/124.2, 526/116; 252/183.13

(56) References Cited

U.S. PATENT DOCUMENTS

| | | | |
|---|---|---|---|
| 3,989,881 A | 11/1976 | Yamaguchi et al. | |
| 4,302,566 A | 11/1981 | Karol et al. | |
| 4,329,253 A | 5/1982 | Goodall et al. | |
| 4,330,649 A | 5/1982 | Kioka et al. | |
| 4,354,009 A | * 10/1982 | Goeke et al. | 526/124.6 |
| 4,379,758 A | * 4/1983 | Wagner et al. | 502/104 |
| 4,379,759 A | * 4/1983 | Goeke et al. | 502/104 |
| 4,383,095 A | * 5/1983 | Goeke et al. | 526/88 |
| 4,393,182 A | 7/1983 | Goodall et al. | |
| 4,395,359 A | * 7/1983 | Wagner et al. | 502/106 |
| 4,414,132 A | 11/1983 | Goodall et al. | |
| 4,427,573 A | * 1/1984 | Miles et al. | 502/111 |
| 4,482,687 A | 11/1984 | Noshay et al. | |
| 4,540,679 A | 9/1985 | Arzoumanidis et al. | |
| 4,612,299 A | 9/1986 | Arzoumanidis et al. | |
| 4,684,703 A | * 8/1987 | Wagner et al. | 526/88 |
| 4,728,705 A | 3/1988 | Nestlerode et al. | |
| 4,764,498 A | * 8/1988 | Wissner et al. | 502/251 |
| 4,771,024 A | * 9/1988 | Nestlerode et al. | 502/127 |
| 4,948,770 A | * 8/1990 | Job | 502/107 |
| 5,019,633 A | * 5/1991 | Wagner et al. | 526/124.6 |
| 5,290,745 A | 3/1994 | Jorgensen et al. | |
| 5,604,172 A | * 2/1997 | Wagner et al. | 502/120 |
| 5,652,314 A | * 7/1997 | Wagner et al. | 526/97 |
| 5,731,393 A | * 3/1998 | Kojoh et al. | 526/124.8 |
| 5,840,808 A | * 11/1998 | Sugimura et al. | 525/268 |
| 6,034,025 A | 3/2000 | Yang et al. | |
| 6,054,542 A | * 4/2000 | Kojoh et al. | 526/124.3 |
| 6,111,038 A | * 8/2000 | Kioka et al. | 526/123.1 |
| 6,200,923 B1 | 3/2001 | Garoff et al. | 502/127 |
| 6,329,454 B1 | 12/2001 | Krabbenborg | |
| 6,384,156 B1 | * 5/2002 | Bernier et al. | 526/88 |
| 6,521,560 B1 | * 2/2003 | Kojoh et al. | 502/104 |

FOREIGN PATENT DOCUMENTS

| | | |
|---|---|---|
| EP | 0352911 A2 | 1/1990 |
| EP | 0463672 A2 | 1/1992 |
| GB | 2049709 A | 12/1980 |
| WO | WO 97/23518 | 7/1997 |
| WO | WO 02/48207 | 6/2002 |

* cited by examiner

*Primary Examiner*—Mark L. Bell
*Assistant Examiner*—Jennine M. Brown

(57) ABSTRACT

A supported catalyst composition comprising the reaction product of i) a magnesium halide, ii) a solvent, iii) an electron donor compound, iv) and a transition metal compound; an inert support; and a cocatalyst composition wherein the supported catalyst is substantially free of other alcohols and wherein the molar ratio of the first alcohol to magnesium is less than or equal to 1.9. Methods of making supported catalyst compositions and methods of making polymers with supported catalysts.

29 Claims, 5 Drawing Sheets

SUPPORTED POLYMERIZATION CATALYST

CROSS REFERENCE TO RELATED APPLICATIONS

Not Applicable.

FEDERALLY SPONSORED RESEARCH

Not Applicable.

REFERENCE TO MICROFICHE APPENDIX

Not Applicable.

FIELD OF THE INVENTION

This invention relates to supported catalyst compositions, methods of making such compositions, and methods for making polymers therefrom.

BACKGROUND OF THE INVENTION

The properties of polymers depend upon the properties of the catalyst used in their preparation. In catalysts, control of the shapes, sizes, and the size distribution of the catalyst is important to ensure a good commercial workability. This is particularly important in gas phase and slurry polymerization. For example, in order to produce copolymer granules of 1000 μm in size, a catalyst particle size of about 10 μm to about 50 μm is generally preferred for use in the polymerization. In the copolymerization of olefins, a catalyst with a developed system of pores in its structure is often desired. Finally, a catalyst needs to posses good mechanical properties to resist wear during the polymerization process and to ensure a good bulk density of the polymer product. One important aspect relating to the development of a polymerization catalyst is, therefore, the provision of a process for production of a catalyst which allows control and adjustment of the structures and sizes of the catalyst's particles and particle size distribution, and yet remains a relatively simple process.

However, reported processes utilizing catalysts containing magnesium and titanium often require a long series of synthetic steps. The synthetic step are designed to provide a catalyst with a high magnesium content because higher concentrations of magnesium increase the activity of the catalyst and result in polymers having more desirable properties. By providing the catalyst on a support material, many of the synthetic steps can be simplified or eliminated. Unfortunately, even where the catalyst is impregnated on a support material, the amount of catalyst that can be incorporated is limited by solubility of the magnesium component in the preparative solvent.

For typical magnesium sources, such as magnesium halides, their solubility in polar organic solvents actually decreases from about room temperature to the boiling point of such solvents. The reduced solubility is thought to result from the formation of polymeric magnesium halide-solvent complexes with lower solubility, such as $MgCl_2(TBF)_{1.5-2}$. For example, solutions of ultra-pure magnesium chloride in tetrahydrofuran (THF) form a solid having an approximate composition of $MgCl_2(TKF)_{1.5}$ precipitates upon heating and the maximum concentration of $MgCl_2$ obtainable in such a solution is less than about 0.75 moles $MgCl_2$/liter. At about 60° C., near the boiling point of THF, the solubility is noticeably decreased to less than 0.5 moles/liter. However, when commercial grade magnesium chloride is used, its maximum solubility in THF is lowered, presumably due to impurities such as water, to about 0.6 moles $MgCl_2$/liter. In these cases, the solubility is only about 0.35 moles/liter at 60° C. Such low solubility of magnesium sources limits the amount and distribution of magnesium halide that can be incorporated into a supported catalyst particle.

Generally, lower solubility in the solvent results in lower magnesium halide concentrations in resulting catalyst particles. However, another problem associated with the use of magnesium halides is selective precipitation. Magnesium halides tend to form deposits readily on the outer surfaces of a porous catalyst support during the drying process while the transition metal component remains soluble during drying. Thus, the resulting particle has a fairly uniform transition metal concentration distribution. However, the preferential precipitation of the magnesium halide leads to variations in the magnesium:transition metal ratio throughout the catalyst particle. In some cases the magnesium to transition metal ratio at the outer periphery of the particle may be more than ten times the ratio at the center of the particle.

Thus, new supported catalysts incorporating a relatively higher concentration of magnesium halide within the catalyst particle would be useful. Such higher concentrations should be achieved by a process that does not cause problems in later stages of manufacturing.

SUMMARY OF THE INVENTION

In view of the above needs, the invention provides in one embodiment, a supported catalyst composition, comprising the reaction product of: 1) a catalyst precursor composition itself comprising a reaction product of a) a magnesium halide, b) a solvent, c) an electron donor compound, and d) a transition metal compound wherein the transition metal is a Group 3-10 or Lanthanide element; 2) a porous inert support; and c) a cocatalyst composition.

In another aspect the invention provides methods of making a supported catalyst composition comprising 1) forming a magnesium-containing solution, the solution itself comprising a reaction product of a) a magnesium halide, b) a solvent; and c) an electron donor compound; 2) contacting the magnesium-containing solution with a transition metal compound wherein the transition metal a Groups 3-10 or Lanthanide element to form a catalyst precursor composition; 3) contacting the dissolved catalyst precursor composition with a porous inert support to form a resultant mixture; 4) drying the resultant mixture to form a supported catalyst precursor composition; and 5) activating the supported catalyst precursor composition with a cocatalyst composition.

Also disclosed are methods of making a polymers. The methods comprise reacting at least one polyolefin monomer in the presence of a supported catalyst composition comprising a reaction product of: 1) a magnesium-containing solution, the solution itself comprising a reaction product of a) a magnesium halide; b) a solvent; c) an electron donor compound; d) a transition metal compound wherein the transition metal a Groups 3-10 or Lanthanide element; 2) a porous inert support; and 3) a cocatalyst composition.

The methods and compositions described herein are also characterized by catalyst compositions that are substantially free of other electron donor compounds and wherein the molar ratio of the electron donor compound to magnesium is less than or equal to 1.9.

In some preferred embodiments, the electron donor is the electron donor comprises a linear or branched aliphatic or aromatic alcohol having between 1 and about 25 carbon atoms. Preferred alcohols include methanol, ethanol, propanol, isopropanol, butanol, 2-ethyl hexanol, 1-dodecanol, cyclohexanol, and t-butyl phenol. In some embodiments, the molar ratio of alcohol to magnesium is less than about 1.75. In other embodiments, the molar ratio of the alcohol to magnesium ranges from about 0.1 to about 1.1. In still other embodiments, the molar ratio of the alcohol to magnesium ranges from about 0.1 to about 0.75. In some embodiments, a molar ratio of the alcohol to magnesium ranges from about 0.1 to about 0.5 is preferred.

Preferred transition metal compounds suitable in embodiments of the compositions and methods described herein include compounds of titanium, zirconium, hafnium, vanadium, niobium, tantalum, or combinations thereof. Some titanium compounds follow the formula:

$$Ti(R)_aX_b$$

wherein R is R' or COR' where $R^1$ is a $C_1$ to $C_{14}$ aliphatic or aromatic hydrocarbon radical, X is selected from Cl, Br, I, or mixtures thereof, a is 0 or 1, b is 2 to 4 inclusive, and a+b=3 or 4. Exemplary titanium compounds include $TiCl_3$, $TiCl_4$, $Ti(OC_6H_5)Cl_3$, $Ti(OCOCH_3)Cl_3$, $Ti(OCOC_6H_5)Cl_3$, or mixtures thereof.

The solvent is selected from the group consisting of alkyl esters of aliphatic and aromatic carboxylic acids, ethers, and aliphatic ketones. Preferred alkyl ester solvents include, but are not limited to, methyl acetate, ethyl acetate, ethyl propionate, methyl propionate, ethyl benzoate, and combinations thereof. Preferred ethers include diethyl ether, diisopropyl ether, and di-n-butyl ether, ethylisopropyl ether, methylbutyl ether, methylallyl ether, ethyl vinyl ether, tetrahydrofuran, 2-methyl tetrahydrofuran, and combinations thereof. In some embodiments, tetrahydrofuran is preferred. Exemplary ketone solvents include acetone, methylethyl ketone, cyclohexanone, cyclopentylmethyl ketone, 3-bromo-4-heptanone, 2-chlorocyclo-pentanone, allylmethyl ketone, and combinations thereof. Some embodiments include two or more of such solvents.

Magnesium halides for use in the disclosed compositions include, but are not limited to, $MgCl_2$, $MgBr_2$, $MgI_2$, MgClBr, MgBrI or mixtures thereof. In some embodiments such halides maybe be used to prepare precursor compositions and catalyst compositions that comprise a composition of the formula $$[Mg(ROH)_r]_mTi(OR)_nX_p[Z]_q$$

wherein ROH comprises a linear or branched alcohol having between one and about 25 carbon atoms, R is R' or COR' wherein each R' is individually an aliphatic hydrocarbon radical having between 1 and about 14 carbon atoms or an aromatic hydrocarbon radical having between 1 and about 14 carbon atoms; X is individually Cl, Br, or I; Z is selected from the group consisting of alkyl esters, aliphatic ethers, cyclic ethers, and aliphatic ketones; m ranges from 0.5 to 56; n is 0, 1, or 2; p ranges from 4 to 116; q range from 2 to 85; and r ranges from 0.1 to 1.9. In some preferred embodiments, r ranges from 0.1 to less than about 0.5.

In some embodiments, compositions herein further comprise a mixture or reaction product of a Lewis acid with the catalyst precursor composition or catalyst composition. Some suitable Lewis acids follow the formula $R_gMX_{3-g}$ wherein R is R' or OR' or $NR'_2$ wherein R' is a substituted or unsubstituted aliphatic or aromatic hydrocarbyl group containing 1 to 14 carbon atoms, X is selected from the group consisting of Cl, Br, I, and mixtures thereof; and g ranges 0–3, and M is aluminum or boron.

Exemplary aluminum-containing Lewis acids include tri-n-hexyl aluminum, triethyl aluminum, diethyl aluminum chloride, trimethyl aluminum, dimethyl aluminum chloride, methyl aluminum dichloride, triisobutyl aluminum, tri-n-butyl aluminum, diisobutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{13}O)AlCl_2$, and combinations thereof. Exemplary boron-containing Lewis acids include $BCl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$ and $B(OC_6H_5)_2Cl$, and combinations thereof.

While any cocatalyst may be used, some suitable cocatalysts herein follow the formula $AlX'_d(R'')_cH_e$ wherein X' is Cl or OR''', R'' and R''' are individually $C_1$ to $C_{14}$ saturated hydrocarbon radicals, d is 0 to 1.5, e is 0 or 1; and c+d+e=3. Exemplary cocatalysts include $Al(CH_3)_3$, $Al(C_2H_5)_3$, $Al(C_2H_5)_2Cl$, $Al(i-C_4H_9)_3$, $Al(C_2H_5)_{1.5}Cl_{1.5}$, $Al(i-C_4H_9)_2H$, $Al(C_6H_{13})_3$, $Al(C_8H_{17})_3$, $Al(C_2H_5)_2H$, $Al(C_2H_5)_2(OC_2H_5)$, and combinations thereof.

While any suitable support may be used, exemplary the inert supports include inorganic oxides of transition metals, aluminum, silicon, and combinations thereof. Some inert supports have a surface area of greater than or equal to 3 square meters per gram.

While the size of the supported catalyst compositions herein is not particularly limited, preferred supported catalyst compositions have an average particle size of about 1 to about 250 μm.

Some polymerization processes disclosed herein provided polymers having greater than or equal to about 90 mol percent ethylene and less than or equal to about 10 mol percent of one or more comonomers. Preferred polymers have a density ranging from about 0.88 g/cm³ to about 0.98 g/cm³.

EMBODIMENTS OF THE INVENTION

Figure 1:
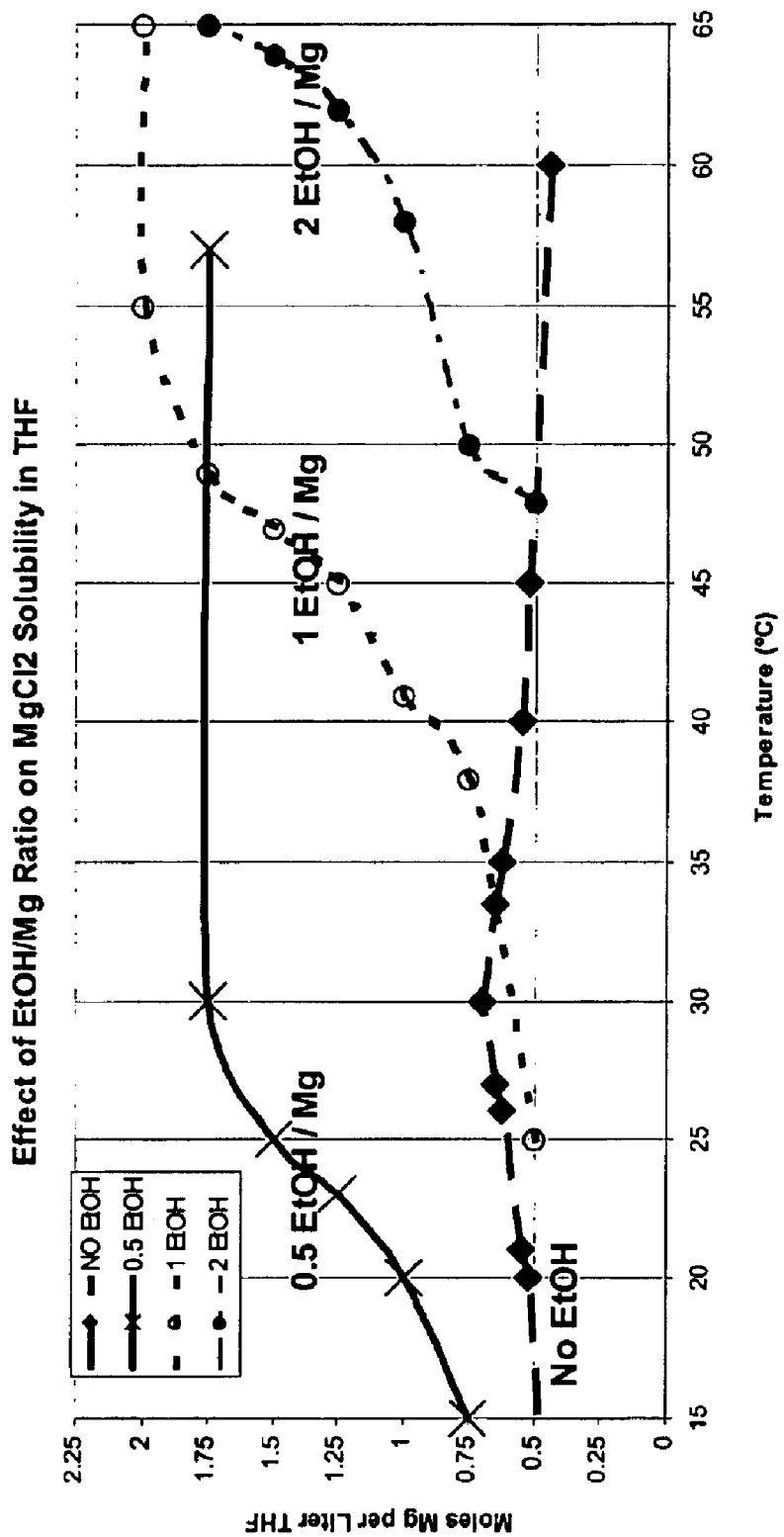
FIG. 1 illustrates solubility behavior of $MgCl_2$ solutions for three embodiments of the invention in THF as a function of alcohol content and solution temperature.

The supported catalysts herein include a porous inert support composition; a mixture or reaction product of a magnesium halide, a solvent compound, an electron donor compound in addition to the solvent, and a transition metal wherein the metal is a Group 3-10 or Lanthanide element; and a cocatalyst composition. The supported catalyst composition is substantially free of other electron donor compounds and the molar ratio of the electron donor compound to magnesium is less than or equal to 1.9.

In the following description, all numbers disclosed herein are approximate values, regardless whether the word "about" or "approximately" is used in connection therewith. They may vary by up to 1%, 2%, 5%, or sometimes 10 to 20%. Whenever a numerical range with a lower limit, $R_L$, and an upper limit $R_U$, is disclosed, any number R falling within the range is specifically disclosed. In particular, the following numbers R within the range are specifically disclosed: $R=R_L+k*(R_U-R_L)$, wherein k is a variable ranging from 1% to 100% with a 1% increment, i.e. k is 1%, 2%, 3%, 4%, 5%, ..., 50%, 51%, 52%, ..., 95%, 96%, 97%, 98%, 99%, or 100%. Moreover, any numerical range defined by two numbers, R, as defined above is also specifically disclosed.

Any reference herein to "electron donor compounds" refers to compounds that modify the solubility of a magnesium halide in the electron donor solvent so that the solubility does not decrease over any temperature interval up to the boiling point of the electron donor solvent. As used herein "electron donor compounds" do not include "solvents" as they are defined below, even when such solvents have electron donor character. Exemplary electron donor compounds include alcohols, thiols, weakly donating amines and phosphines. As used herein the term "substantially free of other electron donor compounds" means that other "electron donor compounds," as they are defined herein, are not present at concentrations higher than levels normally found as impurities in solvent-grade supplies of such compounds. Thus, compositions having a solvent with electron donating characteristics and an "electron donor compound" are considered to be "substantially free of other electron donor compounds." In some embodiments, "substantially free of" means less than 1%, 0.1%, 0.01% or 0.001%.

Useful solvents include any ether, ketone, or ester compound. While such solvents possess electron donor characteristics, any reference herein to a "solvent" or "solvents" does not include those compounds defined above as "electron donor compounds." Thus, compositions that are "substantially free of other electron donor compounds" may include one or more "solvents."

As used herein the term "ether" is defined as any compound of the formula R—O—R', where R and R' are substituted or unsubstituted hydrocarbyl groups. In some cases, R and R' are the same. Exemplary, but not limiting, symmetric ethers are diethyl ether, diisopropyl ether, and di-n-butyl ether. Exemplary nonsymmetric ethers include ethylisopropyl ether and methylbutyl ether. Examples of suitable substituted ethers include, for example, methylallyl ether and ethylvinyl ether. In still other embodiments, R and R' may form a fused ring that may be saturated or unsaturated. One example of such a compound is tetrahydrofuran. Another suitable such cyclic ether is 2-methyl tetrahydrofuran. Again, specifically enumerated compounds are intended only as examples of types of compounds that are suitable, however, any compound having ether R—O—R' functionality is envisioned.

As used herein, the term "ketone" is intended to indicate any compound having the formula $R(C=O)R'$. R and R' may be individually substituted or unsubstituted hydrocarbyl groups and as otherwise described above with reference to ethers. Exemplary ketones are acetone, methylethyl ketone, cyclohexanone, cyclopentylmethyl ketone. Halogenated ketones, such as 3-bromo-4-heptanone or 2-chlorocyclopentanone may also be suitable. Other suitable ketones may include other functional groups such as unsaturations, as in allylmethyl ketone. Each of these compounds fits the formula $R(C=O)R'$ wherein the carbon atom of the carbonyl group of the molecule forms bonds to two other carbon atoms.

Useful ester solvents include any compound of the general formula $R(C=O)OR'$. In such compounds the carbon atom of the carbonyl group forms one bond to a carbon atom and another bond to an oxygen atom. R and R' are individually selected from substituted or unsubstituted hydrocarbyl groups and may be the same or different. In some embodiments, the ester include alkyl esters of aliphatic and aromatic carboxylic acids. Cyclic esters, saturated esters and halogenated esters are also included in this group. Exemplary, but non-limiting, esters include methyl acetate, ethyl acetate, ethyl propionate, methyl propionate, and ethyl benzoate. Again, specifically enumerated compounds are intended only as examples of types of compounds that are suitable. Any compound meeting the general formula $R(C=O)OR'$ functionality is envisioned.

Any suitable solvent may be contacted with the magnesium source by directly mixing as magnesium halide with the solvent. In some embodiments, the magnesium halide is magnesium chloride; however, magnesium bromine and magnesium iodine may also be used. Useful sources of the halides are magnesium halides, such as $MgCl_2$, $MgBr_2$, $MgI_2$, or mixed magnesium halides such as MgClI, MgClBr, and MgBrI. In some embodiments, the magnesium halide is added to the solvent in anhydrous form. In other embodiments, the magnesium halide is added in a hydrated form.

Generally, the solvent is provided in large excess with respect to the first coordination environment of magnesium. In some embodiments, the ratio of solvent to magnesium is about 100 to 1, in other embodiments the ratio may be even larger. In yet other embodiments, the solvent is present at a ratio of from at least about 1.0, at least about 2.0, at least about 5.0 at least about 10 or at least about 20 moles of solvent per mole of magnesium. In some embodiments, two or more solvents may be employed.

An electron donor compound is added to the mixture of the solvent and the magnesium halide by any suitable means. Preferably, the electron donor compound is directly added to the mixture. In some embodiments, the electron donor compound is an alcohol, thiol, weakly donating amine, or weakly donating phosphine. When the electron donor is an alcohol, it can be any one chemical compound having a general formula ROH. R may be any substituted or unsubstituted hydrocarbyl group. In some embodiments, the alcohol is an aliphatic alcohol with from about 1 to about 25 carbon atoms. In some embodiments, the alcohol is a monodentate alcohol. As used herein the term "monodentate alcohol" refers to those in which R may be provided that the substitution does not result in a molecule with more than one hydroxyl (OH) functionality that coordinates to the magnesium atom in solution. Exemplary such alcohols may include methanol, ethanol, propanol, isopropanol, and butanol. Alcohols containing a longer chain aliphatic group such as 2-ethylhexanol or 1-dodecanol also form solutions in which the solubility of the magnesium halide increases with temperature. Alcohols with more carbon atoms are also useful. The alcohol may also be a cyclic alcohol such as cyclohexanol or an aromatic alcohol such as t-butyl phenol.

In some embodiments, the ratio of electron donor compound to magnesium added to the solution is less than or equal to about 1.9, less than about 1.75, less than 1.5, or less than 1.0. In other embodiments, the ratio of electron donor compound to magnesium is less than about 0.75, less than about 0.5, or less than about 0.25. In still other embodiments, the molar ratio of electron donor to the magnesium is about 0.1. Other embodiments may have a ratio of electron donor to magnesium that is greater than about 1.9, such as about 2.0, about 2.1, about 2.2, about 2.5 and about 3.0.

The addition of small amounts of one electron donor compound to mixtures containing the solvent and a magnesium halide produces a magnesium-containing composition whose solubility increases with temperature whose solubility at the boiling point of the solvent is relatively higher that that of magnesium halide/electron donor adducts where no electron donor compound is present. It is believed that the addition of small amounts of one electron donor to the solvent in the presence of a magnesium halide suppresses the conversion of soluble species to polymeric adducts. In some embodiments, the soluble species follow the formula $$MgX_x(ED)_y(Z)_z$$

wherein x is generally 2, satisfying the oxidation state of magnesium, y is less than or equal to 4, and x+y+z is less than or equal to 6. In other embodiments, y may be about 0.5, 0.75, 1, 1.5, 1.75 or about 1.9 or less. In some other embodiments y is about 0.1, 0.25, 0.3 or 0.4. The solubility of these species generally increases with temperature. Where the solvent is THF, the concentration of magnesium halide in the solution may be up to five times higher than in comparable solutions lacking an electron donor compound.

FIG. 1 illustrates the solubility profile of magnesium chloride solutions as a function of temperature in tetrahydrofuran and an alcohol. As FIG. 1 illustrates, compositions having no alcohol generally have a solubility of magnesium halide that increases from about 0.5 moles magnesium per liter to a maximum of less than about 0.65 moles magnesium per liter at about 30° C. Above 30° C. the solubility gradually decreases until the boiling point of the solvent is reached. In contrast, mixtures to which an alcohol, such a ethanol, has been added have a solubility of magnesium halide that does not decrease as the temperature is increased up to the boiling point of the solvent. For instance, mixtures having a ratio of ethanol to magnesium is about 0.5 show that the solubility of magnesium at 15° C. the is about 0.75 mol/liter. The solubility of magnesium chloride increases as the temperature increases up to about 30° C. where the concentration of magnesium in solution is about 1.75 moles/liter. As the temperature is increased above 30° C., the solubility remains substantially constant until the boiling point is reached.

FIG. 1 also illustrates the solubility behavior of mixtures having a ratio of alcohol to magnesium that is about 1. At 25° C. the concentration of magnesium present in solution is about 0.5 moles/liter. However, the concentration increases to about 2 moles/liter by the time the temperature reaches about 55° C. and remains substantially constant up to the solvent boiling point. Samples having a ratio of two moles of alcohol to magnesium also show that the solubility of the magnesium increases as a function of temperature up to the boiling point where the value is about 1.75 moles of magnesium per liter.

Figure 2:
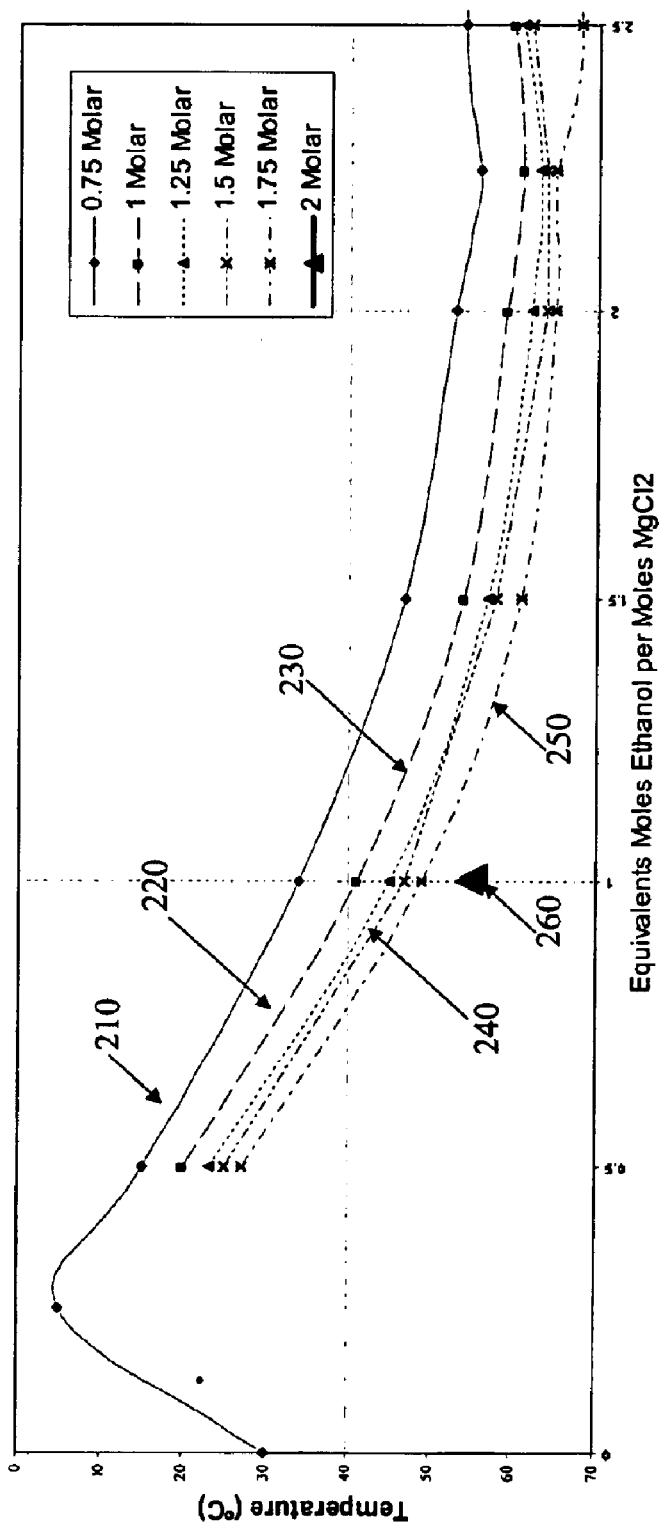
FIG. 2 illustrates the solubility profile of several embodiments of the invention as a function of temperature, $MgCl_2$ concentration, and alcohol:Mg ratio THF.

FIG. 2 illustrates the solubility profile of several mixtures containing different amounts of added alcohol. Each point of data in FIG. 2 was generated by adding the amount of magnesium chloride needed to achieve the desired concentration when all the magnesium chloride dissolved in THF. A portion of alcohol was then added to give the desired alcohol: magnesium ratio and the mixture was heated until the composition had dissolved in the THF. The solution was then slowly cooled until a precipitate began to form. The temperature at which the precipitate begins to form is recorded as the y axis in FIG. 2. Thus, FIG. 2 shows the temperature needed to prepare magnesium chloride solutions of different concentrations in the presence of an alcohol. For instance, data set 210 illustrates the temperature necessary to achieve a solution that is about 0.75M in magnesium chloride where the solvent is THF in the presence of different concentrations of ethanol. In mixtures prepared with an alcohol to magnesium ratio of 0.25, the concentration of magnesium in solution is about 0.75M at only 5° C. Mixtures prepared with a ratio of alcohol to magnesium chloride ratio of 0.5 reach a concentration of 0.75M in magnesium at about 15° C. while a mixture with a ratio of 1.0 reaches 0.75M at about 33° C. Where the mixture is prepared to have a ratio of 1.5 or 2.0 moles of alcohol to magnesium chloride, the solutions achieve a magnesium concentration of about 0.75M at about 47° C. and 53° C., respectively. Thus, data set 210 indicates that mixtures with higher alcohol:magnesium ratios tend to be less soluble.

Thus, FIG. 2 illustrates that smaller ratios of alcohol to magnesium chloride produce solutions with a higher concentration of dissolved magnesium. The decrease in solubility with increasing ROH/MgCl$_2$ ratio suggests that small amounts of added ROH prevent the formation of the polymeric MgCl$_2$(THF)$_2$ adduct, and addition of larger amounts of ROH, or additional alcohols, drives the solution towards less soluble adducts containing more ROH. The ratio of ROH/Mg employed determines the maximum solubility can be reached and the temperature needed. Data sets 220–260 of FIG. 2 indicate that for a given alcohol:magnesium ratio, increasing the temperature increases the amount of magnesium that is soluble. For example, solutions having an alcohol:magnesium molar ratio of 0.5 have a concentration of magnesium in solution of about 0.75M at about 15° C. while at about 20° C. a 1.0M concentration of magnesium in solution is obtainable. Line 230 shows that at about 23° C. the same solution can dissolve about 1.25 moles/liter of magnesium chloride. FIG. 2 also shows that the solubility of magnesium chloride in such solutions also increases for temperatures above 30° C. For instance, solutions having a molar ratio of alcohol to magnesium of 1 show that at a temperature of about 35° C. the solubility of magnesium chloride is about 0.75M while at about 41° C. the solubility increases to about 1M. The data of lines 230–260 show indicate that the solubility continues to increase as the boiling point of the THF is approached. Solutions having higher ratios of alcohol:magnesium display similar behavior.

The nature of the species in solution has been elucidated by a variety of characterization methods. NMR studies indicate that electron donors coordinated to MgCl$_2$ in THF solution are in rapid equilibrium, and no individual long-lived species exists. The gas phase over a THF solution containing MgCl$_2$ and 2 equivalents of ethanol (EtOH) per Mg contains significantly less alcohol than the gas phase over the same EtOH/THF solution not containing MgCl$_2$. This suggests that the ethanol is sequestered by the MgCl$_2$ molecules in the solution. It is apparent that the alcohol functionality is coordinated to the MgCl$_2$ center in the solution phase. The maximum of solubility at intermediate alcohol:MgCl$_2$ ratios suggests that several species are in solution, whose concentration depends on the identity of the alcohol, the specific alcohol:Mg ratio, and on the temperature of the solution.

Figure 3:
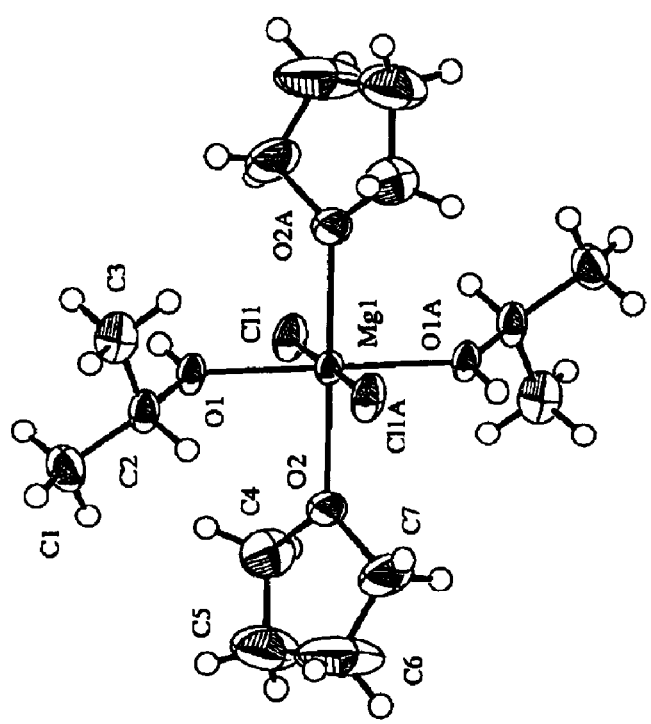
FIG. 3 illustrates the structure of an exemplary magnesium halide-containing catalyst component.

FIG. 3 illustrates the x-ray, single crystal structure of an exemplary catalyst component isolated as a solid. As FIG. 3 illustrates, this compound comprises a magnesium-centered molecule. In this embodiment, the compound has two THF electron donor solvent molecules bonded to the magnesium, as well as, two halides in the form of chlorine and two alcohol molecules. Thus, the precursor has the formula MgCl$_2$ROH$_2$THF$_2$, in which ROH is isopropyl alcohol. Analogous compounds where ROH is ethanol can also be isolated. In this particular embodiment, the structure illustrated is generally referred to as a trans-octahedral magnesium-centered structure since ligands of the same type are related through a center of symmetry on the magnesium atom. However, such a structure is not required for any embodiment of the catalyst component. In other embodiments, the component may be mixtures of two or more individual compounds. For example, in one embodiment, the component may comprise a mixture of $MgCl_2ROH_2THF_2$ and $MgCl_2ROH_1THF_3$. Any number of individual compounds is envisioned so long as the composition of the mixture as a whole satisfies the formula $MgX_x(ED)_yS_z$ where x is less than or equal to 1.9.

In other embodiments, the magnesium halide catalyst component has a formula according to

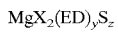

$$MgX_2(ED)_yS_z$$

where y+z is less than or equal to 4 and y is less than or equal to 1.9. In those embodiments where y+z is less than 4, the catalyst component may be considered solvent deficient. These compositions may also be referred to as non-stoichiometric compositions. These compositions may be obtained in solid form from the fully coordinated $MgCl_2(ROH)_2(TBF)_2$ or other $MgX_x(ED)_yS_z$ composition by heating, applying reduced pressure, or combinations of both.

Figure 4:
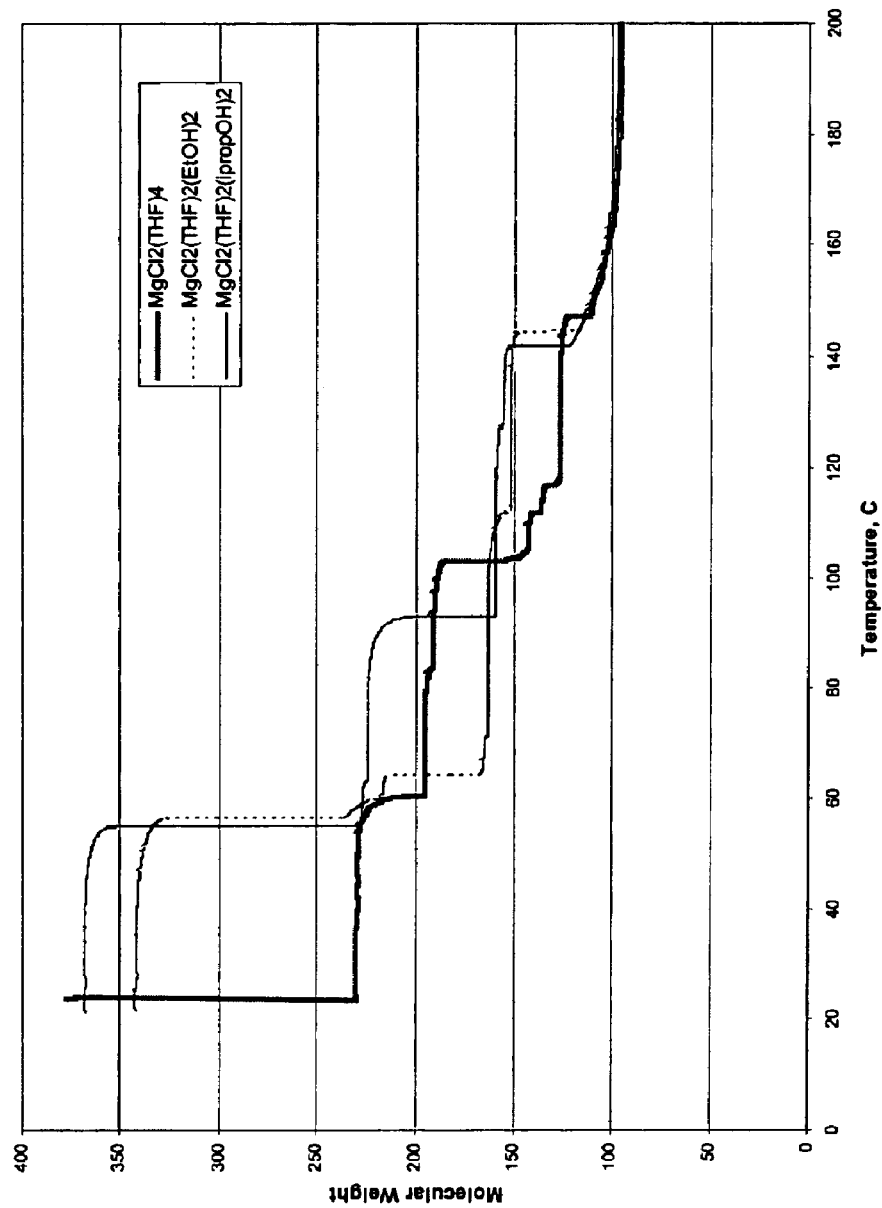
FIG. 4 illustrates the thermogravimetric analysis (TGA) behavior for embodiments of the inventive catalyst component.

FIG. 4 illustrates thermogravimetric analysis (TGA) measurements showing the behavior of $MgCl_2(ROH)_2(THF)_2$. TGA measurements were made at a heating rate of 10° C./minute during periods when no weight loss is measured. In periods where the sample is losing mass, the temperature ramp was eliminated until no further weight loss was measured. As FIG. 4 indicates, most of the solvent and alcohol can be stripped off by heating the composition to 50° C.–200° C., with one of the THF molecules being lost first, followed by both ROH and THF (FIG. 4). Thus, in some embodiments the catalyst component may have a coordinatively unsaturated and polymeric, rather than a monomeric, structure.

In forming a catalyst precursor, a magnesium component is contacted with a titanium source. Suitable magnesium components are disclosed in copending applications by Burkhard E. Wagner, et. al. entitled "Enhanced Solubility of Magnesium Halides and Catalysts and Polymerization Processes Employing Same", filed on Jul. 15, 2002, incorporated herein by reference; "Spray-Dried Polymerization Catalyst and Polymerization Processes Employing Same", filed on Jul. 15, 2002, incorporated herein by reference; and "Spray-Dried Polymerization Catalyst and Polymerization Processes Employing Same", filed on Jul. 15, 2002, incorporated herein by reference.

Transition metal compounds that are soluble in the solvent may be used as a source of transition metal for the catalyst. The quantity of a transition metal compound or mixture of transition metal compounds, used in preparing catalysts precursors may vary widely depending on the type of catalyst desired. In some embodiments, the molar ratio of magnesium to transition metal compound may be as high as about 56, preferably about 20 to about 30. In other embodiments, the molar ratio of magnesium to transition metal 30 compound is as low as about 0.5. Generally, molar ratios of magnesium to transition metal compound of about 3 to about 6 where the transition metal is titanium are preferred.

In still other embodiments, the titanium may be supplied by a compound having a general formula $Ti(OR)_aX_b$ wherein R is a $C_1$ to $C_{14}$ aliphatic or aromatic hydrocarbon radical, or COR' where R' is a $C_1$ to $C_{14}$ aliphatic or aromatic hydrocarbon radical, X is selected from the group consisting of Cl, Br, I, or mixtures thereof, a is 0 or 1, b is 2 to 4 inclusive and a+b=3 or 4. Examples of some suitable titanium compounds include, but are not limited to, $TiCl_3$, $TiCl_4$, $Ti(OC_6H_5)Cl_3$, $Ti(OCOCH_3)Cl_3$ and $Ti(OCOC_6H_5)Cl_3$. In some embodiments, one titanium compound may be used while in others the titanium source may be one or more different titanium containing compounds. Regardless of the source of titanium, it may be added to the mixture of the magnesium precursor solution in an amount to achieve a molar ratio of magnesium to titanium of about 0.5 to about 1.0, about 1.0 to about 5.0, about 5.0 to about 10.0 or about 10.0 to about 56.

The titanium source may be added to the reaction mixture at any convenient time. In other embodiments, the titanium is added after the magnesium halide and electron donor compound have been added to the solvent. In some embodiments, the catalyst precursor composition has a formula following the general equation

$$[Mg(ROH)_r]_mTi(OR)_nX_p[Z]_q$$

where ROH is a linear or branched alcohol having between one and about 25 carbon atoms, R is R' or COR' where each R' is individually an aliphatic hydrocarbon radical having between one and about 14 carbon atoms or an aromatic hydrocarbon radical having between one and about 14 carbon atoms, X is individually Cl, Br, or I. In the formula, Z is a solvent selected from the group consisting of alkyl esters of aliphatic and aromatic carboxylic acids, aliphatic ethers, cyclic ethers, and aliphatic ketones, m ranges from 0.5 to 56, n is 0, 1, or 2, p ranges from 4 to 116, q ranges from 2 to 85, and r ranges from 0.1 to 1.9. In some embodiments, of the formula r is 0.25, 0.3, 0.4, 0.5, 0.75, 1.0, 1.25, 1.5 or 1.75.

Catalyst precursor compositions are contacted with a porous inert support to form a supported or impregnated catalyst precursor composition. Typically a solution containing the mixture or reaction product of the magnesium-halide composition and the titanium source is contacted with the support material. Suitable supports are solid, particulate compounds or compositions which are inert to the other components of the catalyst composition, and to the other active components of the reaction system. In some embodiments, the support is an inorganic compound such as, but not limited to, oxides of transition metals, silicon, or aluminum and molecular sieves, as well as organic compounds such as porous polymers. Combinations of support compounds are also suitable. The support may be used in the form of dry powders having an average particle size of about 1 to about 250 μm, and preferably of about 10 to about 100 μm for gas phase applications and about 1 to about 100 μm for slurry applications. These compounds are also porous and have a surface area of about 3 to about 500 m²/gram, a pore volume of about 0.4 cc/g to about 4 cc/g and an average pore diameter of greater than about 100 Å. In certain embodiments, the inert support has a surface area of about 300 m²/gram. These support should be dry, that is free of absorbed water. Drying of the support is carried out by heating it at a temperature below the sintering or melting point of the support material. Typically, temperatures of at least 100° C. are used. Lower temperatures may be used where prolonged drying times are acceptable or where the support has a low melting or sintering temperature. Inorganic support materials are typically dried at a temperature of about 200° C.–800° C. In addition, the support material may be optionally treated with about 1 to 8 weight percent of one or more of the aluminum alkyl compounds described above. This modification of the support by the aluminum alkyl compounds provides the catalyst composition with increased activity and also improves polymer particle morphology of the resulting ethylene polymers.

After the catalyst precursor composition has been contacted with the support material, excess solvent can be removed. Any suitable method can be used. Generally, excess solvent is removed by heating, applying reduced pressure, or a combination of both. In some embodiments, the supported catalyst precursor is then obtained as a fine, free-flowing powder. In some embodiments, the supported catalyst precursor may have characteristics or a mixture of crystalline, phases, amorphous phases, or have characteristics or a mixture with crystalline and amorphous components. Average particle size of the supported catalyst precursor composition is generally determined by the particle size of the support, indicating that in at least some embodiments, the solubility of the magnesium halide was not exceeded and that the catalyst precursor composition is impregnated within the pores of the support material.

Generally, the ratio of precursor catalyst composition to support material is about 0.1 to 1, and preferably about 0.1 to 0.5. Further discussion of impregnation of solid supports with catalyst precursors is to be found in U.S. Pat. No. 4,302,565, which is incorporated herein by reference in its entirety. The ratio of precursor composition to support material should be chosen to provide a supported catalyst precursor compositions with a magnesium concentration of greater than about 0.75 mmol of magnesium per gram of catalyst. In other embodiments the magnesium concentration may be about 1.0 mmol/gram, about 1.5 mmol/gram, about 2.0 mmol/gram or about 2.5 mmol/gram of catalyst. In other embodiments, the magnesium concentration may be about 3.0 mmol/gram, about 3.2 mmol/gram, about 3.4 mmol/gram, 3.6 mmol/gram or about 3.8 mmol/gram. Other embodiments may have higher concentrations of magnesium.

In some embodiments, the supported catalyst precursor is modified with at least one Lewis acid or Lewis acid composition. Treatment can be effected by dissolving the Lewis acid compound(s) in an inert liquid solvent and applying the resulting solution to the supported precursor composition in any convenient manner, e.g., by simply immersing the supported precursor composition in the Lewis acid solution. The solvent for the Lewis acid should be non-polar and capable of dissolving the Lewis acid compound(s) but not the precursor composition. Among the solvents which can be employed to dissolve the Lewis acid compound(s) are hydrocarbon solvents, including substituted hydrocarbon solvents, such as isopentane, hexane, heptane, toluene, xylene, naphtha and aliphatic mineral oils, such as but not limited to Kaydol™, Hydrobrite™ 1000, Hydrobrite™ 550, and the like. Preferably, such solvents are employed together with the Lewis acid compound(s) in such amounts that the resulting solution contains from about 1 percent by weight to about 25 percent by weight of the Lewis acid compound (s).

If desired, supported catalyst precursor composition may be added to the inert solvent to form a slurry before the Lewis acid compound(s) is dissolved in the solvent. Alternatively, the Lewis acid compound(s) can be dissolved in an inert solvent before it is combined with the supported catalyst precursor composition. This technique is particularly suitable when a gas such as $BCl_3$ is employed. Alternatively, if desired, the Lewis acid can be directly added to the dry precursor composition.

Generally, useful Lewis acid compounds have the structures $R_gAlX_{3-g}$ and $R_gBX_{3-g}$ where R is R' or OR' or $NR'_2$ and R' is a substituted or unsubstituted aliphatic hydrocarbyl group containing 1 to 14 carbon atoms, or a substituted or unsubstituted aromatic hydrocarbyl radical containing from 6 to 14 carbon atoms; X is selected from the group consisting of Cl, Br, I, and mixtures thereof; and g in each case is 0–3.

Suitable Lewis acid compounds include tri-n-hexyl aluminum, triethyl aluminum, diethyl aluminum chloride, trimethyl aluminum, dimethyl aluminum chloride, methyl aluminum dichloride, triisobutyl aluminum, tri-n-butyl aluminum, diisobutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{13}O)AlCl_2$, and the corresponding bromine and iodine compounds.

Suitable boron halide compounds include $BCl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$ and $B(OC_6H_5)_2Cl$. Bromine and iodine-containing congeners of the above-listed compounds may also be used. The Lewis acids can be used individually or in combinations thereof.

Further details concerning Lewis acids which are suitable for the present purpose can be found in U.S. Pat. Nos. 4,354,009 and 4,379,758 which are incorporated herein in their entirety.

The catalyst precursor or supported catalyst precursor is treated with an activator cocatalyst. Typically, cocatalysts follow the formula $AlX'_d(R'')_cH_e$ where X' is Cl or OR'''. R'' and R''' are individually $C_1$ to $C_{14}$ saturated hydrocarbon radicals; d is 0 to 1.5; e is 0 or 1; and c+d+e=3. Exemplary cocatalysts include $Al(CH_3)_3$, $Al(C_2H_5)_3$, $Al(C_2H_5)_2Cl$, $Al(i-C_4H_9)_3$, $Al(C_2H_5)_{1.5}Cl_{1.5}$, $Al(i-C_4H_9)_2H$, $Al(C_6H_{13})_3$, $Al(C_8H_{17})_3$, $Al(C_2H_5)_2H$, $Al(C_2H_5)_2(OC_2H_5)$, or mixtures thereof.

In some embodiments, the supported catalyst precursor is partially activated outside the polymerization reactor with cocatalyst in a hydrocarbon slurry. This partial activation is optional. After contacting the supported catalyst precursor composition with the cocatalyst, the hydrocarbon solvent is removed by drying and the catalyst composition can be fed to the polymerization reactor where the activation is completed with additional amounts of any suitable cocatalyst In the first stage the supported catalyst precursor is reacted with the cocatalyst to provide a molar ratio of Al:Ti of about 0.1, 0.5, 1, 2, 5, or 6. In some embodiments, the activation is carried out in a hydrocarbon solvent followed by drying of the resulting mixture, to remove the solvent, at a temperature of at least 20, 30 40 or 50° C. In some embodiments the temperature is less than 50, 60, 70 or 80° C. Another alternative partial activation procedure is described in U.S. Pat. No. 6,187,866 in which the partial activation procedure occurs in a continuous fashion.

In some embodiments, especially those in which the catalyst has not been fully activated, additional activator compound can be added to the polymerization reactor to further activate the catalyst. In some embodiments, the partially activated catalyst or the supported catalyst precursor composition and additional cocatalyst are fed into the reactor by separate feed lines. In other embodiments, a mineral oil suspension of the partially activated supported catalyst and the cocatalyst are supplied in one feed line to the reactor. Alternatively, a mineral oil slurry of the precursor composition can be treated with the activator compound, and the resultant slurry can be fed into the reactor. The additional cocatalyst may be sprayed into the reactor in the form of a solution thereof in a hydrocarbon solvent such as isopentane, hexane, or mineral oil. This solution usually contains about 2 to 30 weight percent of the cocatalyst composition. The cocatalyst may also be added to the reactor in solid form, by being absorbed on a support. In some embodiments, the support contains about 10 to about 50 weight percent of the activator for this purpose. The additional cocatalyst is added to the reactor in such amounts to produce, in the reactor, a total Al/Ti molar ratio of about 10, about 15, about 25, about 45, about 60, about 100, or about 200 to 1. In other embodiments, the ratio may be about 250 or about 400 to 1. The additional amounts of activator compound added to the reactor further activate the supported catalyst.

Embodiments of the catalysts described above may be used in solution, slurry or gas-phase polymerizations. Supported catalysts described above may be prepared for use in slurry polymerization according to any suitable techniques. In some embodiments, such catalysts are prepared in the same manner as those used in gas phase polymerizations. Slurry polymerization conditions include polymerization of $C_2$–$C_{20}$ olefin, diolefin, cycloolefin, or mixture thereof in an aliphatic solvent at a temperature below that at which the polymer is readily soluble in the presence of the supported catalyst. Slurry phase processes suited for ethylene homopolymerization and copolymerizations of ethylene with $C_3$ to $C_8$ α-olefins, such as for example, 1-butene, 1-hexene, 4-methyl-1-pentene, and 1-octene, may also be performed with embodiments of the inventive catalysts. High density polyethylene (HDPE), medium density polyethylene (MDPE), and linear low density polyethylene (LLDPE) may be prepared.

In a continuous gas phase process, the partially or completely activated precursor compositions are continuously fed to the reactor, with discrete portions of any additional activator compound needed to complete the activation of the partially activated precursor composition, during the continuing polymerization process in order to replace active catalyst sites that are expended during the course of the reaction.

Polymerization reactions are typically conducted by contacting a stream of ethylene, in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) at a temperature and at a pressure sufficient to initiate the polymerization reaction. Embodiments of the supported catalyst are suitable for the polymerization of $C_2$–$C_6$ olefins including homopolymers and copolymers of ethylene with α-olefins such as 1-butene, 1-hexene, and 4-methyl, 1-pentene. In general, the reaction may be performed at any conditions suitable for Ziegler-Natta type polymerizations conducted under slurry or gas phase conditions. Such processes are used commercially for the production of high density polyethylene (HDPE), medium density polyethylene (MDPE), and linear low density polyethylene (LLDPE).

Figure 5:
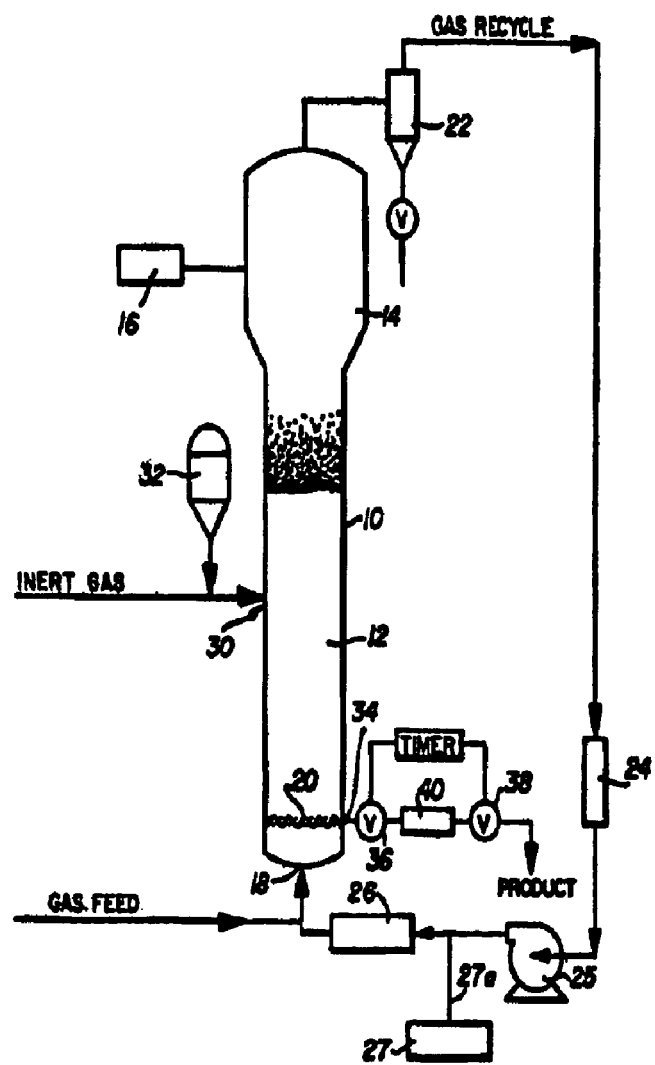
FIG. 5 illustrates a fluidized bed reaction system useful in embodiments of the invention.

A fluidized bed reaction system can be used in gas phase polymerization. Fluid bed reaction systems are discussed in detail in U.S. Pat. Nos. 4,302,565 and 4,379,759 which are incorporated herein by reference in their entirety. However for convenience, FIG. 5 illustrates an exemplary fluid bed reactor system which can be used in embodiments of the invention. The reactor 10 consists of a reaction zone 12 and a velocity reduction zone 14. The reaction zone 12 comprises a bed of growing polymer particles, formed polymer particles and a minor amount of catalyst particles fluidized by the continuous flow of polymerizable and modifying gaseous components in the form of make-up feed and recycle gas through the reaction zone. The mass gas flow rate through the bed is sufficient for fluidization. $G_{mf}$ is used in the accepted form as the abbreviation for the minimum mass gas flow required to achieve fluidization, C. Y. Wen and Y. H. Yu, "Mechanics of Fluidization," Chemical Engineering Progress Symposium Series, Vol. 62, p. 100–111 (1966). In some embodiments the mass gas flow rate is 1.5, 3, 5, 7 or 10 times $G_{mf}$. The bed is prepared to avoid the formation of localized "hot spots" and to entrap and distribute the particulate catalyst throughout the reaction zone. On start up, the reaction zone is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated precursor compound (the catalyst) used in the fluidized bed is preferably stored for service in a reservoir 32 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross sectional area. It is thus dependent on the geometry of the reactor.

Make-up gas is generally fed to the bed at a rate equal to the rate at which particulate polymer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure proper fluidization, the recycle gas and where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the recycle line. Where desired, the recycle gas may then be passed through a preliminary heat exchanger 24 designed to cool small entrained particles to sticking in the downstream heat exchanger 26.

The recycle gas is compressed in a compressor 25 and then passed through a heat exchanger 26 where it is stripped of heat of reaction before it is returned to the bed. By constantly removing heat of reaction, no noticeable temperature gradient appears to exist within the upper portion of the bed. A temperature gradient exists in the bottom of the bed in a layer of about 6 to 12 inches, between the temperature of the inlet gas and the temperature of the remainder of the bed. Thus, it has been observed that the bed acts to adjust the temperature of the recycle gas above this bottom layer of the bed zone to make it conform to the temperature of the remainder of the bed thereby maintaining itself at an essentially constant temperature under steady state conditions. The recycle is then returned to the reactor at its base 18 and to the fluidized bed through distribution plate 20. The compressor 25 can also be placed upstream of the heat exchanger 26.

The fluidized bed contains growing and formed particulate polymer particles as well as catalyst particles. As the polymer particles are hot and possible active, they must be prevented from settling, for if a quiescent mass is allowed to exist, any active catalyst contained therein may continue to react and cause fusion. Recycle gas is diffused through the bed at a rate sufficient to maintain fluidization at the base of the bed. The distribution plate 20 serves this purpose and may be a screen, slotted plate, perforated plate, a plate of the bubble cap type and the like. The elements of the plate may all be stationary, or the plate may be of the mobile type disclosed in U.S. Pat. No. 2,298,792. Whatever its design, it should diffuse the recycle gas through the particles at the base of the bed to keep them in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction. The ratio of hydrogen/ethylene employed varies between about 0 to about 2.0 moles of hydrogen per mole of the ethylene in the gas stream.

Compounds of the structure $ZnR_aR_b$, where $R_a$ and $R_b$ are the same or different $C_1$ to $C_{14}$ aliphatic or aromatic hydrocarbon radicals, may be used in conjunction with hydrogen, as molecular weight control or chain transfer agents to increase the melt index values of the polymers that are produced. From about 0 to 50, and preferably about 20 mols to about 30 mols of the Zn compound (as Zn) would be used in the gas stream in the reactor per mol of titanium compound (as Ti) in the reactor. The zinc compound would be introduced into the reactor preferably in the form of a dilute solution (2 to 30 weight percent) in hydrocarbon solvent or absorbed on a solid diluent, such as silica, of the types described above, in amounts of about 10 to 50 weight percent. These compositions tend to be pyrophoric. The zinc compound may be added alone or with any additional portions of the activator compound that are to be added to the reactor from a feeder, not shown, which would feed the compound to the hottest portion of the gas recycle system, such as adjacent to feeder 27 disclosed herein.

Any gas inert to the catalyst and reactants can also be present in the gas stream. The activator compound is preferably added to the reaction system at the hottest portion of the recycle gas stream. Addition into the recycle line downstream from the heat exchanger is thus preferred, as from dispenser 27 through line 27A.

To insure that sintering does not occur, operating temperatures below the sintering temperature are desired. For the production of ethylene homopolymers, an operating temperature of about 30° C. to 115° C. is preferred, and a temperature of about 90° C. to 105° C. is preferably used to prepare products having a density of about 0.961 to 0.968.

The fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The partially or completely activated precursor composition is injected into the bed at a rate equal to its consumption at a point 30 which is above the distribution plate 20. Preferably, the catalyst is injected at a point above the distribution plate. Since the disclosed catalysts are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots."

A gas which is inert to the catalyst such as nitrogen or argon may be used to carry the partially or completely reduced precursor composition, and any additional activator compound that is needed, into the bed. Alternatively, a mixture of solvents, such as isopentane, pentane, hexane, or the like, may be used as carrier for catalysts present in slurry form. Nitrogen may also be used in conjunction with the carrier.

The production rate of the bed is controlled by the rate of catalyst injection. The production rate may be increased by simply increasing the rate of catalyst injection and decreased by reducing the rate of catalyst injection.

Since changes in the rate of catalyst injection changes the rate of generation of the heat of reaction, the temperature of the recycle gas is adjusted upwards or downwards to accommodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 34 at or close to the distribution plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to await the next product recovery operation. A fluidized bed discharge process according to U.S. Pat. No. 4,621,952, incorporated herein by reference in its entirety, may also be used.

Finally, the fluidized bed reactor is equipped with an adequate venting system to allow venting the bed during start up and shut down. The reactor does not require the use of stirring means and/or wall scraping means.

The supported catalyst system described herein appears to yield a fluid bed product with an average particle size between about 0.005 to about 0.06 inches, sometimes about 0.02 to about 0.04 inches and having a catalyst residue that is unusually low. For typical polymerization conditions, catalyst residues in the polymers range from about 0.1 to about 10 ppm of titanium.

The feed stream of gaseous monomer, with or without inert gaseous diluents, is fed into the reactor at a space time yield of about 2 to 10 pounds/hour/cubic foot of bed volume.

The molecular weight of the polymer is conveniently indicated using melt flow measurements. One such measurement is the melt index (MI), obtained according to ASTM D-1238, Condition E, measured at 190° C. and an applied load of 2.16 kilogram (kg), reported as grams per 10 minutes. Polymers prepared using some catalysts described herein have MI values ranging from about 0.01 to about 10,000 grams/10 min. Melt flow rate is another method for characterizing polymers and is measured according to ASTM D-1238, Condition F, using 10 times the weight used in the melt index test above. The melt flow rate is inversely proportional to the molecular weight of the polymer. Thus, the higher the molecular weight, the lower the melt flow rate, although the relationship is not linear. The melt flow ratio (MFR) is the ratio of melt flow rate to the melt index. This correlates with the molecular weight distribution of the product polymer. Lower MFRs indicates narrower molecular weight distributions. Polymers prepared using some catalysts described herein have MFR values ranging from about 20 to about 40.

Polymers may also be characterized by their density. Polymers herein may have a density of from about 0.85 to about 0.98 g/cm$^3$ as measured in accordance with ASTM D-792 in which a plaque is made and conditioned for one hour at 100° C. to approach equilibrium crystallinity. Measurement for density is then made in a density gradient column.

EXAMPLES

The following examples are given to illustrate various embodiments of the invention described herein. They should not be construed to limit the invention otherwise as described and claimed herein. All numerical values are approximate.

Preparation of Comparative 3:1 Mg/Ti, 0.25 mmol Ti/g Precursor

In a glass-lined 4 liter mixing vessel equipped with a helical paddle stirrer and external heating jacket was placed 2913 g (3.28 liter) of dry tetrahydrofuran (THF) under nitrogen. Then was added 87 g (0.91 mol) anhydrous MgCl$_2$ powder followed by 61 g (0.31 mol) aluminum-reduced titanium trichloride (TiCl$_3$—AA). The slurry turned from chalk white to aqua-green. Heating at a jacket temperature of 70–75° C. for five hours under nitrogen caused all solids to dissolve. A blue-green solution was formed.

Grace Davison Sylopol 955 was passivated by dehydration at 600° C., followed by treatment with 5.5 wt. % triethyl aluminum in isopentane slurry. The silica was dried by evaporation. 530 g of the above passivated silica was added to the 4 liter mixing vessel under nitrogen, and 1750 g of the previously prepared MgCl$_2$/TiCl$_3$ solution in THF was added, followed by another 337 g of dry THF to form a freely-flowing blue-purple slurry. The slurry was heated to 70–75° C. external jacket temperature and mixed for two hours under reduced pressure (5 inches vacuum) to remove the solvent/slurrying agent. 619 g dry, freely-flowing 3:1 impregnated precursor was discharged from the vessel. Analysis: 1.23% Al, 1.77% Mg, 1.18% Ti, 12.2% THF (0.72 mmol Mg/g, 0.25 mmol Ti/g).

Attempted Preparation of an Unmodified 5:1 Mg/Ti, 0.25 mmol Ti/g Precursor

The above experiment was repeated, except that 88.3 g (0.93 mol) MgCl$_2$ and 39 g (0.19 mol) TiCl$_3$—AA in 1950 g THF solution were used. No additional electron donor was added. The MgCl$_2$ was found to be essentially all dissolved at room temperature (0.47 mmol MgCl$_2$/g THF), but gave a chalky white suspension at 50° C. After addition of 490 g passivated silica, the slurry was stirred at 55° C. for one hour. The jacket temperature was increased to 90° C., and 5" vacuum was applied. The slurry was dried for 2 hours over a 15 psi nitrogen sweep. A solid mass of precursor was formed which rotated at the speed of the helical stirrer around which it was plastered. The solid mass of precursor did not flow freely from the vessel and which contained large chips that replicated the shape of the vessel wall and the stirrer blade.

Preparation of an Ethanol-modified 5:1 Mg/Ti Precursor (0.25 mmol Ti/g)

The same equipment as described above was used. 4022 g dry THF and 184 g (1.93 mol) anhydrous MgCl$_2$ powder were stirred at 65° C. for 5 hours. The nominal slurry concentration was 0.48 mmol Mg/g THF. A milky-white slurry containing undissolved MgCl2 was formed. 90 g of 200 proof ethanol (1.95 mol, 1:1 ROH/Mg) was then added. A clear solution was formed which was allowed to cool to room temperature over night.

1500 g (720 mmol Mg) of an ethanol-modified MgCl$_2$ solution (~0.6 M) was charged to the 4 liter mix tank, followed by 39 g (0.19 mol) aluminum-reduced TiCl$_3$ (TiCl$_3$-AA), followed by an additional 440 g (211 mmol) MgCl$_2$ solution. The green solution was heated to 50° C., and inspected for precipitation. All components remained in solution. Then was added 487 g of the passivated Grace-Davison Sylopol 955 silica, and the slurry was stirred at 55° C. for one hour. The jacket temperature was increased to 90° C., and 5" of vacuum was applied. The slurry was dried for 2 hours over a 15" nitrogen sweep. 597 g freely flowing precursor catalyst was discharged. There was no solid residue on the walls, and only minimal residue on the helical stirrer. Analysis: 0.26 mmol Ti/g, 1.19 mmol Mg/g, 11.35% THF, 2.63% ethanol. Particle size distribution (Malvern 2600) was essentially unchanged from the starting silica particle size (no agglomeration).

Preparation of Other Modified Precursors

The same procedures as above were used to make the other ethanol-modified precursors used below, except that the amounts of alcohol, MgCl$_2$, and TiCl$_3$—AA were adjusted appropriately. Prepared were 3:1 Mg/Ti, 0.25 mmol Ti/g precursors at 0.5:1, and 1:1 ROH/Mg ratio, and 3:1 Mg/Ti, 0.49 mmol Ti/g precursor at 1:1 ROH/Mg ratio. Freely-flowing, non-agglomerated precursors were obtained in all cases.

Preparation of Reduced Precursors (0.45 DEAC/THF, 0.2 TNHAL/THF)

460 g of the high Mg/Ti supported catalyst precursor (nominally 0.25 mmol Ti/g, 1.25 mmol Mg/g, 11.35% THF) prepared above was transferred to the 4 liter mix vessel under nitrogen at room temperature. Then was charged 1900 ml isopentane to form a freely-flowing slurry. Then was charged 837 ml (325 mmol, 0.45 mmol/mmol THF) of 10% diethylaluminum chloride (DEAC) in isopentane. The freely-flowing tan slurry was stirred for 30 minutes, and 423 ml (145 mmol, 0.20 mmol/mmol THF) of 20% tri-n-hexyl aluminum (TNHAL) in isopentane was added. The dark brown slurry was stirred for 30 minutes, and was then dried at 70° C. jacket temperature with 5 psi nitrogen purge for two hours. 500 g of freely-flowing tan catalyst was recovered. Analysis: 0.55 mmol Al/g; 0.20 mmol Ti/g; 0.87 mmol Mg/g; 3.2 mmol chloride/g.

Other supported catalyst precursors were analogously reduced with the appropriate amount of reducing agents to give 0.45 DEAC/THF and 0.20 TNHAL/THF ratios. All were freely-flowing dark brown powders Ethylene Polymerization Process in a Slurry Reactor Each laboratory scale polymerization trial was conducted as follows. To 500 ml of hexane in a 1 liter slurry polymerization autoclave were added 1.25 mmol of triethylaluminum ((C$_2$H$_5$)$_3$Al) under nitrogen, followed by a mineral oil slurry of catalyst precursor containing from 0.0075 mmol to 0.030 mmol of Ti as indicated. Higher activity catalysts were run at a lower charge to maintain control over the polymerization, and other catalysts were run at the same catalyst charge where feasible. The reactor was pressurized to 40 psig with hydrogen gas, then further pressurized to a total of 200 psig with ethylene. The polymerization was conducted at a temperature of 85° C. for half an hour. Results for these slurry polymerizations are recorded in Table I along with the results for Comparative Example 1.

TABLE I

| Run | Mg/Ti | ROH/Mg | Ti mmol/g | Ti (μmol) | Activity[a] | Productivity[b] | MI, dg/min | MFR | Bulk Density, g/cc |
|---|---|---|---|---|---|---|---|---|---|
| 1* | 3 | 0 | 0.25 | 29 | 6180 | 1550 | 0.5 | 31 | 0.336 |
| 2 | 3 | 0.5 | 0.28 | 29 | 6700 | 1900 | 0.8 | 26 | 0.325 |
| 3 | 3 | 1 | 0.28 | 31 | 7000 | 1950 | 1 | 27 | 0.354 |
| 4 | 3 | 1 | 0.42 | 39 | 5000 | 2100 | 0.6 | 29 | 0.332 |
| 5 | 5 | 0.5 | 0.23 | 26 | 8700 | 2000 | 1 | 25 | 0.36 |
| 6 | 5 | 1 | 0.26 | 30 | 9100 | 2400 | 1.4 | 28 | 0.337 |

*comparative example
[a] in g PE/(mmol titanium-hr-100 psi $C_2$)
[b] in g PE/(g catalyst-hr-100 psi $C_2$)

Table I demonstrates that supported catalysts of Examples 2–3 and 5–6 have higher activity on a per-Ti basis and per g-catalyst basis than comparative Example A. Moreover, supported catalysts of Examples 2–6 do not result in a significant drop in resin bulk density despite the higher catalyst productivity.

Slurry polymerization reactions were also performed using reduced supported catalysts. These reduced supported catalysts also have higher activity than the comparative catalyst without a significant drop in bulk density.

TABLE II

| Run | Mg:Ti | ROH:Mg | Ti mmol/g | Ti (μmol) | Activity[a] | Productivity[b] | MI, dg/min | MFR | Bulk Density, g/cc |
|---|---|---|---|---|---|---|---|---|---|
| 7* | 3 | 0 | 0.20 | 29 | 3000 | 600 | 0.75 | 28 | 0.398 |
| 8 | 3 | 0.5 | 0.23 | 9 | 4000 | 900 | 1.3 | 28 | 0.383 |
| 9 | 3 | 1 | 0.33 | 33 | 3300 | 1100 | 0.7 | 27 | 0.41 |
| 10 | 5 | 0.5 | 0.19 | 8.2 | 5350 | 1000 | 1.1 | 26 | 0.373 |
| 11 | 5 | 1 | 0.20 | 7.7 | 5150 | 1000 | 1.2 | 28 | 0.388 |

*Comparative example
[a] in g PE/(mmol titanium-hr-100 psi $C_2$)
[b] in g PE/(g catalyst-hr-100 psi $C_2$)

The data of Table II demonstrates the relationship between partial activation in the mix tank and subsequent catalyst activity of the control catalyst and resin bulk density. As a result of partial activation with DEAC/TNHAL, catalyst activity of the control catalyst is decreased when compared to results with the corresponding control precursor. The partially activated precursors of the current invention still obey this relationship. The catalysts also show higher activity on a per g-catalyst basis than comparative Example 7. Additionally, a catalyst with high per-particle activity and good resin bulk density can be obtained by increasing the loading of both $MgCl_2$ and $TiCl_3$ (constant Mg/Ti).

Ethylene Polymerization Process in a Fluid Bed Reactor

In separate trials in a fluid bed reactor, the partially activated precursors of Table II were used in gas phase fluid bed polymerizations. An 8-inch gas phase fluid bed reactor of reaction volume 50 l which is capable of polymerizing olefins at a rate of 5–7 lb/hr at 300 psi pressure was used. A 5 lb startup bed of nominally identical nature as the resin to be produced was employed. Triethyl aluminum was fed through a separate feed line to give a 40:1 Al:Ti ratio in the reactor. The reaction temperature was 88° C.; 1-hexene and hydrogen were also fed into the reactor in amounts indicated in Table III to control polymer density and molecular weight.

TABLE III

| Example | Mg/Ti | ROH/Mg | $C_2$ Partial Pressure, psi | $C_6/C_2$ | $H_2/C_2$ | Residence Time, hrs | Productivity, lb PE/lb Ti | MI, dg/min | Density, g/cc |
|---|---|---|---|---|---|---|---|---|---|
| 12* | 3 | 0 | 95 | 0.15 | 0.22 | 4 | 225,000 | 0.6 | 0.918 |
| 13 | 3 | 0.5 | 95 | 0.17 | 0.22 | 3.4 | 710,000 | 1.8 | 0.917 |
| 14 | 5 | 0.5 | 95 | 0.15 | 0.22 | ND(a) | >1,500,000 | ND | ND |
| 15 | 5 | 0.5 | 85 | 0.15 | 0.3 | 2.9 | 1,000,000 | 2.5 | 0.917 |

TABLE III-continued

| Example | Mg/Ti | ROH/Mg | $C_2$ Partial Pressure, psi | $C_6/C_2$ | $H_2/C_2$ | Residence Time, hrs | Productivity, lb PE/lb Ti | MI, dg/min | Density, g/cc |
|---|---|---|---|---|---|---|---|---|---|
| 16 | 5 | 0.5 | 85 | 0.16 | 0.68 | 3.1 | 320,000 | 20 | 0.918 |
| 17* | 3 | 0 | 85 | 0.16 | 0.68 | ND(b) | <100,000 | ND | ND |

*Comparative Example
ND = not determined
(a) too active for process conditions
(b) not sufficiently active for process conditions.

The results in Table III show that the catalysts are readily able to make polymers for which the catalyst of the prior art were not sufficiently active to main a sufficient production rate, or gave too low a resin particle size due to the low catalyst activity. For example, the comparative catalysts of Examples 12 and 17 have productivity values of 225,000 and <100,000 lb polyethylene/lb Ti. On the other hand, each of the catalysts of Examples 13–16 have catalyst productivities of 320,000 lb polyethylene/lb Ti or higher. In fact, while the comparative catalysts are not active enough, the catalyst of Example 14 is too active for the employed ethylene partial pressure. The data also demonstrate that these catalysts are able to make a film-grade polymer at lower ethylene partial pressure than the catalyst of the prior art.

While the invention has been described with a limited number of embodiments, these specific embodiments are not intended to limit the scope of the invention as otherwise described and claimed herein. Modification and variations from the described embodiments exist. For example, various other additives, not enumerated herein, may also be used to further enhance one or more properties of the catalyst and catalyst precursor compositions and polymers made therefrom. It is understood that parameters of polymerization processes may vary, for example, in temperature, pressure, monomer concentration, polymer concentration, hydrogen partial pressure and so on. Therefore, catalysts which do not fulfill the selection criteria under one set of reaction conditions may nevertheless be used in embodiments of the invention under another set of reaction conditions. While all of the embodiments are described with reference to a single catalyst, it by no means precludes the use of two, three, four, five, or more catalysts simultaneously in a single reactor with similar or different capability for molecular weight and/or comonomer incorporation. In some embodiments the supported catalysts may also include additives or other modifiers. In other embodiments, the supported catalysts do not include, or are substantially free of, any compounds not enumerated herein. Moreover, variations and modifications therefrom exist. It should be recognized that the process described herein may be used to make polymers which also incorporate one or more additional comonomers. The incorporation of additional comonomers may result in beneficial properties which are not available to homopolymers or copolymers. While the processes are described as comprising one or more steps, it should be understood that these steps may be practiced in any order or sequence unless otherwise indicated. These steps may be combined or separated. Finally, any number disclosed herein should be construed to mean approximate, regardless of whether the word "about" or "approximate" is used in describing the number. Last but not the least, the claimed supported catalysts are not limited to the processes described herein. They can be prepared by any suitable process. The appended claims intend to cover all such variations and modifications as falling within the scope of the invention.

What is claimed is:

1. A supported catalyst composition, comprising the reaction product of:

a) a catalyst precursor composition comprising a reaction product of
      i) a magnesium halide;
      ii) a solvent said solvent selected from the group consisting of alkyl esters of aliphatic and aromatic carboxylic acids, ethers, and aliphatic ketones;
      iii) an electron donor compound comprising a linear or branched aliphatic or aromatic alcohol having between 1 and 25 carbon atoms; and
      iv) a transition metal compound wherein the transition metal is a Group 3-10 or Lanthanide element; and b) a porous inert support;

c) a cocatalyst composition wherein the supported catalyst composition is substantially free of electron donor compounds other than those comprising a linear or branched aliphatic or aromatic alcohol having between 1 and 25 carbon atoms and wherein the molar ratio of the electron donor compound to magnesium is less than or equal to 1.9.

2. A method of making a supported catalyst composition, comprising:

a) forming a magnesium-containing solution comprising a reaction product of
      i) a magnesium halide
      ii) a solvent said solvent selected from the group consisting of alkyl esters of aliphatic and aromatic carboxylic acids, ethers, and aliphatic ketones; and
      iii) an electron donor compound comprising a linear or branched aliphatic or aromatic alcohol having between 1 and 25 carbon atoms;

b) contacting the magnesium-containing solution with a transition metal compound wherein the transition metal a Groups 3-10 or Lanthanide element to form a catalyst precursor composition, wherein the catalyst composition is substantially free of electron donor compounds other than those comprising a linear or branched aliphatic or aromatic alcohol having between 1 and 25 carbon atoms, and wherein the ratio of the electron donor compound to magnesium in the catalyst composition is less than or equal to 1.9;

c) contacting the dissolved catalyst precursor composition with a porous inert support to form a resultant mixture;

d) drying the resultant mixture to form a supported catalyst precursor composition; and e) activating the supported catalyst precursor composition with a cocatalyst composition.

3. A method of making a polymer, comprising reacting at least one polyolefin monomer in the presence of a supported catalyst composition comprising a reaction product of:

a) a magnesium-containing solution comprising a reaction product of:
   i) a magnesium halide;
   ii) a solvent said solvent selected from the group consisting of alkyl esters of aliphatic and aromatic carboxylic acids, ethers, and aliphatic ketones; and
   iii) an electron donor compound comprising a linear or branched aliphatic or aromatic alcohol having between 1 and 25 carbon atoms;
   iv) a transition metal compound wherein the transition metal a Groups 3-10 or Lanthanide element;
b) a porous inert support; and
c) a cocatalyst composition wherein magnesium-containing solution, the transition metal compound, and inert support form a catalyst precursor composition and the supported catalyst composition is substantially free of electron donor compounds other than those comprising a linear or branched aliphatic or aromatic alcohol having between 1 and 25 carbon atoms wherein the molar ratio of the electron donor compound to magnesium is less than or equal to 1.9.

4. A supported catalyst precursor composition, comprising the reaction product of:
a) a catalyst precursor composition comprising a reaction product of
   i) a magnesium halide;
   ii) a solvent maid solvent selected from the group consisting of alkyl esters of aliphatic and aromatic carboxylic acids, ethers, and aliphatic ketones;
   iii) an electron donor compound comprising a linear or branched aliphatic or aromatic alcohol having between 1 and 25 carbon atoms; and
   iv) a transition metal compound wherein the transition metal is a Group 3-10 or Lanthanide element; and
b) a porous inert support;

wherein the supported catalyst composition is substantially free of electron donor compounds other than those comprising a linear or branched aliphatic or aromatic alcohol having between 1 and 25 carbon atoms and wherein the molar ratio of the electron donor compound to magnesium is less than or equal to 1.9.

5. The composition of claim 4, wherein the molar ratio of the alcohol to magnesium is less than 1.75.

6. The composition of claim 4, wherein the molar ratio of the alcohol to magnesium ranges from 0.1 to 0.75.

7. The composition of claim 4, wherein the molar ratio of the alcohol to magnesium ranges from 0.1 to 0.5.

8. The composition of claim 4, wherein the transition metal compound includes titanium, zirconium, hafnium, vanadium, niobium, tantalum, or combinations thereof.

9. The composition of claim 4, wherein the transition metal compound follows the formula:

$$Ti(R)_a X_b$$

wherein
R is R' or COR' where R' is a $C_1$ to $C_{14}$ aliphatic or aromatic hydrocarbon radical, X is selected from Cl, Br, I, or mixtures thereof, a is 0 or 1, b is 2 to 4 inclusive, and a+b=3 or 4.

10. The composition of claim 9 wherein the transition metal compound is $TiCl_3$, $TiCl_4$, $Ti(OC_6H_5)Cl_3$, $Ti(OCOCH_3)Cl_3$, $Ti(OCOC_6H_5)Cl_3$, or mixtures thereof.

11. The composition of claim 4, wherein the electron donor compound is selected from the group consisting of methanol, ethanol, propanol, isopropanol, butanol, 2-ethyl hexanol, 1-dodecanol, cyclohexanol, and t-butyl phenol.

12. The composition of claim 4 wherein the alkyl esters of aliphatic and aromatic carboxylic acids are selected from the group consisting of methyl acetate, ethyl acetate, ethyl propionate, methyl propionate, ethyl benzoate, and combinations thereof.

13. The composition of claim 4 wherein the ethers are selected from the group consisting of diethyl ether, diisopropyl ether, and di-n-butyl ether, ethylisopropyl ether, methylbutyl ether, methylallyl ether, ethyl vinyl ether, tetrahydrofuran, 2-methyl tetrahydrofuran, and combinations thereof.

14. The composition of claim 4 wherein the ketones are selected from the group consisting of acetone, methylethyl ketone, cyclohexanone, cyclopentylmethyl ketone, 3-bromo-4-heptanone, 2-chlorocyclo-pentanone, allylmethyl ketone, and combinations thereof.

15. The composition of claim 4, wherein the composition further includes a second solvent selected from the group consisting of alkyl esters of aliphatic and aromatic carboxylic acids, aliphatic ethers, cyclic ethers, and aliphatic ketones.

16. The composition of claim 4, wherein the magnesium halide comprises $MgCl_2$, $MgBr_2$, $MgI_2$, $MgClBr$, $MgBrI$ or mixtures thereof.

17. The composition of claim 4, wherein the supported catalyst composition comprises a composition of the formula $$[Mg(ROH)_r]_m Ti(OR)_n X_p [Z]_q$$

wherein
ROH comprises a linear or branched alcohol having between one and 25 carbon atoms, R is R' or COR' wherein each R' is individually an aliphatic hydrocarbon radical having between one and 14 carbon atoms or an aromatic hydrocarbon radical having between one and 14 carbon atoms, X is individually Cl, Br, or I, Z is a compound selected from the group consisting of alkyl esters, aliphatic ethers, cyclic ethers, and aliphatic ketones, m ranges from 0.5 to 56, n is 0, 1, or 2, p ranges from 4 to 116, q ranges from 2 to 85, and r ranges from 0.1 to 1.9.

18. The composition of claim 17 wherein r ranges from 0.1 to less than 0.5.

19. The composition of claim 4, further including a reaction product of a Lewis acid with the composition.

20. The composition of claim 19 wherein the Lewis acid has the formula $R_g MX_{3-g}$ wherein R is R' or OR' or $NR'_2$ wherein R' is a substituted or unsubstituted aliphatic or aromatic hydrocarbyl group containing 1 to 14 carbon atoms and X is selected from the group consisting of Cl, Br, I, and mixtures thereof; and g ranges 0–3, and M is aluminum or boron.

21. The composition of claim 19 wherein the Lewis acid is selected from the group consisting of tri-n-hexyl aluminum, triethyl aluminum, diethyl aluminum chloride, trimethyl aluminum, dimethyl aluminum chloride, methyl aluminum dichloride, triisobutyl aluminum, tri-n-butyl aluminum, diiosbutyl aluminum chloride, isobutyl aluminum dichloride, $(C_2H_5)AlCl_2$, $(C_2H_5O)AlCl_2$, $(C_6H_5)AlCl_2$, $(C_6H_5O)AlCl_2$, $(C_6H_{13}O)AlCl_2$, and mixtures thereof.

22. The composition of claim 19, wherein the Lewis acid is selected from the group consisting of $BCl_3$, $BBr_3$, $B(C_2H_5)Cl_2$, $B(OC_2H_5)_2Cl$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$ and $B(OC_6H_5)_2Cl$, and combinations thereof.

23. The composition of claim 4, wherein the inert support is selected from inorganic oxides of transition metals, aluminum, silicon, and combinations thereof.

24. The composition of claim 4, wherein the inert support has a surface area of greater than or equal to 3 square meters per gram.

25. The composition of claim 4, wherein the composition has an average particle size of 1 to 250 µm.

26. A supported catalyst composition, made from:
   a) a catalyst precursor composition made from:
      i) a magnesium halide;
      ii) a solvent said solvent selected from the group consisting of alkyl esters of aliphatic and aromatic carboxylic acids, ethers, and aliphatic ketones;
      iii) an electron donor compound comprising a linear or branched aliphatic or aromatic alcohol having between 1 and 25 carbon atoms; and
      iv) a transition metal compound wherein the transition metal is a Group 3-10 or Lanthanide element; and
   b) a porous inert support; and.
   c) a cocatalyst composition
   wherein the supported catalyst composition is substantially free of electron donor compounds other than those comprising a linear or branched aliphatic or aromatic alcohol having between 1 and 25 carbon atoms and wherein the molar ratio of the electron donor compound to magnesium is less than or equal to 1.9.

27. A method of making a supported catalyst composition, made from:
   a) forming a magnesium-containing solution made from:
      i) a magnesium halide;
      ii) a solvent said solvent selected from the group consisting of alkyl esters of aliphatic and aromatic carboxylic acids, ethers, and aliphatic ketones; and
      iii) an electron donor compound comprising a linear or branched aliphatic or aromatic alcohol having between 1 and 25 carbon atoms;
   b) contacting the magnesium-containing solution with a transition metal compound wherein the transition metal a Groups 3-10 or Lanthanide element to form a catalyst precursor composition, wherein the catalyst composition is substantially free of electron donor compounds other than those comprising a linear or branched aliphatic or aromatic alcohol having between 1 and 25 carbon atoms, and wherein the ratio of the electron donor compound to magnesium in the catalyst composition is less than or equal to 1.9;
   c) contacting the dissolved catalyst precursor composition with a porous inert support to form a resultant mixture;
   d) drying the resultant mixture to form a supported catalyst precursor composition; and
   e) activating the supported catalyst precursor composition with a cocatalyst composition.

28. A method of making a polymer, made from reacting at least one polyolefin monomer in the presence of a supported catalyst composition said catalyst composition made from a reaction product of:
   a) a magnesium-containing solution comprising a reaction product of:
      i) a magnesium halide;
      ii) a solvent said solvent selected from the group consisting of alkyl esters of aliphatic and aromatic carboxylic acids, ethers, and aliphatic ketones; and
      iii) an electron donor compound comprising a linear or branched aliphatic or aromatic alcohol having between 1 and 25 carbon atoms;
      iv) a transition metal compound wherein the transition metal a Groups 3-10 or Lanthanide element;
   b) a porous inert support; and
   c) a cocatalyst composition
   wherein magnesium-containing solution, the transition metal compound, and inert support form a catalyst precursor composition and the supported catalyst composition is substantially free of electron donor compounds other than those comprising a linear or branched aliphatic or aromatic alcohol having between 1 and 25 carbon atoms wherein the molar ratio of the electron donor compound to magnesium is less than or equal to 1.9.

29. A supported catalyst precursor composition, made from the reaction product of:
   a) a catalyst precursor composition made from a reaction product of
      i) a magnesium halide;
      ii) a solvent said solvent selected from the group consisting of alkyl esters of aliphatic and aromatic carboxylic acids, ethers, and aliphatic ketones;
      iii) an electron donor compound comprising a linear or branched aliphatic or aromatic alcohol having between 1 and 25 carbon atoms; and
      iv) a transition metal compound wherein the transition metal is a Group 3-10 or Lanthanide element; and
   b) a porous inert support;
   wherein the supported catalyst composition is substantially free of electron donor compounds other than those comprising a linear or branched aliphatic or aromatic alcohol having between 1 and 25 carbon atoms and wherein the molar ratio of the electron donor compound to magnesium is less than or equal to 1.9.

* * * * *